United States Patent [19]

Raines

[11] Patent Number: 4,629,573

[45] Date of Patent: Dec. 16, 1986

[54] USE OF LOW M.S. HYDROXYETHYL CELLULOSE FOR FLUID LOSS CONTROL IN OIL WELL APPLICATIONS

[75] Inventor: Russell H. Raines, Yorktown Heights, N.Y.

[73] Assignee: Union Carbide Corporation, Danbury, Conn.

[21] Appl. No.: 766,693

[22] Filed: Aug. 19, 1985

Related U.S. Application Data

[63] Continuation of Ser. No. 527,481, Aug. 29, 1983, abandoned, which is a continuation-in-part of Ser. No. 79,883, Sep. 28, 1979, abandoned.

[51] Int. Cl.$^4$ ............................................. C09K 7/02
[52] U.S. Cl. ................................. 252/8.51; 252/8.514
[58] Field of Search ........................ 252/8.5 C, 8.5 A

[56] References Cited

U.S. PATENT DOCUMENTS

| | | | |
|---|---|---|---|
| 2,570,947 | 10/1951 | Himel et al. | 252/8.5 C |
| 3,284,353 | 11/1966 | Batdorf et al. | 252/8.5 C |
| 3,753,903 | 8/1973 | Fischer et al. | 252/8.5 A |
| 3,785,438 | 12/1974 | Jackson et al. | 252/8.5 C X |
| 3,878,141 | 4/1975 | Jackson et al. | 252/8.5 C X |
| 3,953,335 | 4/1976 | Jackson | 252/8.5 A |
| 3,989,632 | 11/1976 | Fischer et al. | 252/8.5 A |

Primary Examiner—Herbert B. Guynn
Attorney, Agent, or Firm—Henry H. Gibson

[57] ABSTRACT

Improved drilling operations for recovery of gas and/or oil from a porous subterranean formation are achieved using a drilling fluid, circulated in a well penetrating the subterranean formation, which minimizes loss of said drilling fluid into the surrounding porous formation. The improvement comprises employing a drilling fluid comprising water and an effective amount of hydroxyethyl cellulose having a molar substitution value of from about 1.1 to about 1.6, and an apparent viscosity in water of at least about 15 cps.

6 Claims, 2 Drawing Figures

USE OF LOW M.S. HYDROXYETHYL CELLULOSE FOR FLUID LOSS CONTROL IN OIL WELL APPLICATIONS

This application is a continuation of application Ser. No. 527,481, filed Aug. 29, 1983, which is a continuation-in-part of application Ser. No. 79,883, filed Sept. 28, 1979, both now abandoned.

BACKGROUND OF THE INVENTION

The present invention generally relates to drilling operations conducted by the petroleum industry for the recovery of oil and/or gas from subterranean formations. More particularly, the invention relates to a method of minimizing fluid loss from drilling fluids which are circulated through the wellbores penetrating such formations.

In conventional well drilling operations for the recovery of oil and/or gas from permeable subterranean formations, it is the usual practice to circulate a drilling fluid downwardly through the drill pipe, outwardly through the bit mounted at the end of the pipe and upwardly through the annulus thereof to the surface for the purpose of cooling the drill pipe and bit and transporting cuttings out of the bore hole. Water and various brines are among the commonly used drilling fluids for this purpose.

In most drilling operations, circulation of the drilling fluid is accomplished by a loss of fluid from the wellbore into the porous or fractured formation. "Fluid loss" is thus generally defined as the migration of the liquid portion of a drilling fluid or mud into the surrounding formation. Such fluid loss is undesirable because it tends to weaken the stability of the formation.

Many additives for drilling fluids and muds are known in the art for purposes of fluid loss control. U.S. Pat. No. 3,993,570 discloses the use of starch and organic starch derivatives to impart fluid loss control to wellbore fluids. Carboxymethyl cellulose and various clays are also known for this purpose. Bridging particles comprised of solid carbonate powders which serve to "bridge" across or plug the pores of a permeable formation are disclosed in U.S. Pat. No. 3,689,410. The bridging paticles are incorporated into the circulating drilling fluid and deposited therefrom onto the porous formation. U.S. Pat. Nos. 3,878,141 and 3,785,438 to Jackson et al. disclose hydroxyethyl cellulose as a fluid loss additive when used in conjunction with bridging particles composed of solid thermoplastic resins. The molar substitution of such hydroxyethyl cellulose material is not disclosed in the patents; high M.S. material being presumably as effective as low M.S. material. Moreover, to the extent that claim 1 of each of the aforementioned Jackson et al. patents states that hydroxyethyl cellulose serves as a fluid loss additive, such teaching is apparently negated by the Abstract of each of the patents which in referring to the invention therein disclosed states that "fluid loss control is established by the use of colloidal additives such as lignosulfonates . . . " (see lines 1-3 of the second paragraph of the Abstract), the inclusion of hydroxyethyl cellulose in the fluid of the invention being presumably for its known function as a solution thickener.

"Cellosize" hydroxyethyl cellulose manufactured by Union Carbide Corporation is a known viscosifier for oil and gas well drilling, completion and workover fluids. The molar substitution ("M.S.") of the commercially available material is 2.0; "molar substitution" as used herein being defined as the average number of ethylene oxide molecules that have reacted with each anhydroglucose unit of the cellulose molecule. This definition of "M.S." is in accord with that set forth, for example, in U.S. Pat. No. 3,284,353. Other commercially available hydroxyethyl cellulose materials which have heretofore been suggested for use in oil well drilling applications have an M.S. of 2.0 or higher. See, for example, U.S. Pat. No. 3,284,353 which discloses hydroxyethyl cellulose having an M.S. of 2.5 as a drilling mud additive.

The prevalent use of hydroxyethyl cellulose (HEC) material as a viscosifier for drilling fluids is attributable to its enhanced thickening properties and solubility characteristics at M.S. values of 2.0 or above. Since it is generally believed in the art that fluid loss is reduced at increased fluid viscosities (see U.S. Pat. No. 3,853,903 at column 2, lines 66-68) relatively high viscosity fluids are generally desired provided such viscosity is consistent with other desired flow characteristics. Hence, there has been no incentive in the prior art to use HEC materials having M.S. values substantially below 2.0 (corresponding to lower solubility of the HEC additive and less viscous drilling fluids) for oil well applications.

While HEC has gained commercial acceptance as a viscosifier in a variety of drilling fluids, it has heretofore been unable to minimize fluid loss in such fluids to an acceptable level. This is evidenced by the fact that when drilling fluids containing commercial hydroxyethyl cellulose in normal oil well concentrations are tested for fluid loss using the standard API fluid loss test (hereinafter described), such fluids exhibit inordinately high rates of fluid loss. Specifically, the aforementioned tests generally result in a "blowout", commonly defined as an API fluid loss in excess of 350 ml/30 min.; fluid loss rates above 100 ml/30 min. being generally considered commercially unacceptable.

As used throughout the specification and claims, the fluid loss of a drilling fluid is defined in terms of the API fluid loss test commonly used in the petroleum industry which is described in "Standard Procedure For Testing Drilling Fluids", Section 3, Filtration, American Petroleum Institute, API RP 13B, 7th Edition, April 1978, pages 8-9. The results of such tests are expressed in ml of filtrate produced in 30 minutes.

DESCRIPTION OF THE INVENTION

Figure 1:
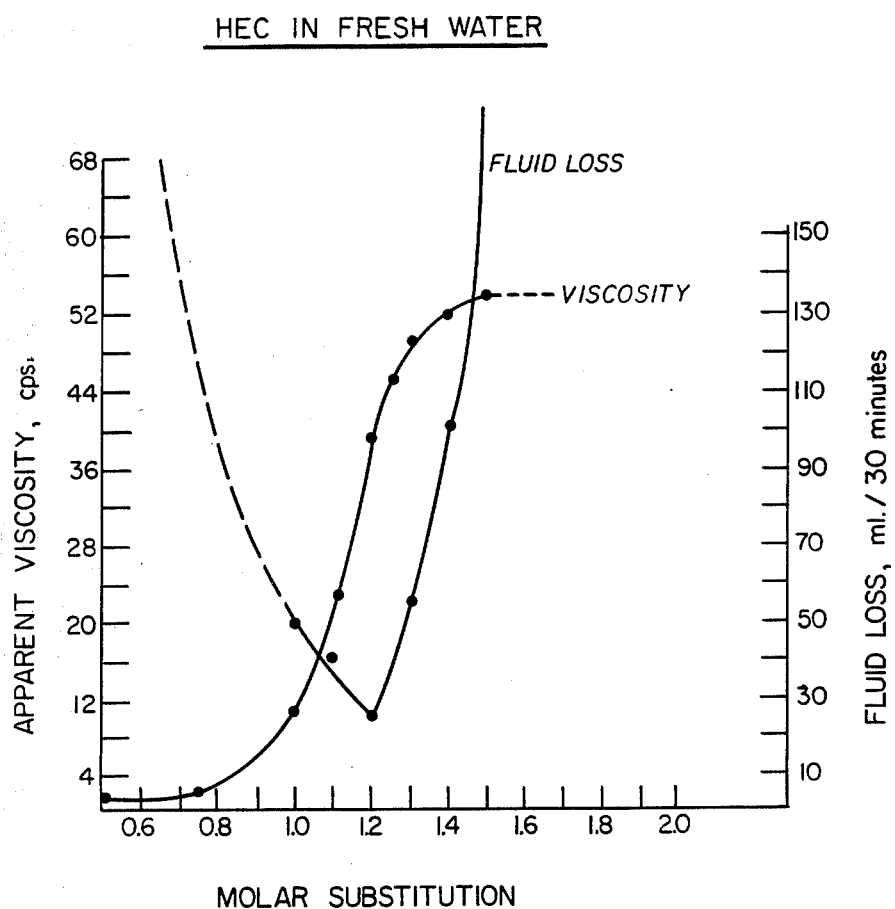
FIG. 1 is a graph of the viscosity and fluid loss values in fresh water for HEC over a range of MS values.

The present invention provides a method of minimizing fluid loss in a drilling operation for gas and/or oil recovery from a porous subterranean formation wherein a drilling fluid is circulated through a wellbore penetrating the formation which comprises employing a drilling fluid containing an effective amount of hydroxyethyl cellulose having a molar substitution value of from about 1.1 to about 1.6 and an apparent viscosity of at least about 15 cps. The improved fluid loss achieved in accordance with the present invention corresponds to an API fluid loss (as hereinabove defined) of generally less than 200 ml/30 min., preferably below 100 ml/30 min. and most preferably below 50 ml/30 min.

Accordingly, effective fluid loss control can be achieved with HEC in accordance with the invention in the absence of additional fluid loss additives or bridging particles in the drilling fluid, such as described in U.S. Pat. Nos. 3,785,438 and 3,878,141. The use of a drilling fluid substantially free of bridging particles is therefore contemplated by the present invention. Similarly, drilling fluids consisting essentially of water, either fresh or brine, and the described HEC may be used as part of the present invention. However, fluid loss additives other than HEC may be used in combination therewith, if desired.

The present invention is predicated on the discovery that the API fluid loss measured in drilling fluids containing hydroxyethyl cellulose having an M.S. value of from about 1.1 to about 1.6 at normal oil field concentrations of from about 0.5 to about 5 lb./barrel, and particularly from about 0.75 to about 3 lb./barrel, is significantly lower than corresponding fluids containing hydroxyethyl cellulose of the type ordinarily used in oil well applications, i.e., HEC having an M.S. value of 2.0 or above. As a consequence, such low M.S. HEC is an effective fluid loss control additive in conventional drilling fluids.

The term "barrel" as used herein refers to a liquid volumetric measure containing 42 gallons, such term being used extensively in the petroleum industry. On an experimental scale, the units of lb/barrel may be conveniently expressed as grams per 350 ml.

For purposes of fluid loss control, the optimum M.S. value of the HEC material varies with the particular drilling fluid employed and the concentration of HEC therein. For a given drilling fluid, the optimum HEC composition is readily determined by simple experimentation. As a practical matter, the choice of the optimum M.S. will be dictated by a trade-off arrived at in attempting to achieve the desired fluid viscosity at the minimum fluid loss.

Fluid viscosities of at least about 15 cps are required in most drilling fluid applications. Preferred fluid viscosity ranges will vary depending upon the particular application for which the drilling fluid is used. For example, fluid viscosities of from about 15 cps to 20 cps are generally preferred during borehole generations whereas higher fluid viscosities usually greater than about 45 cps are preferred during workover and completion. Fluid viscosities may vary based on well-established procedures in the field of drilling fluid technology. Drilling fluids containing HEC having M.S. values of less than about 1.1 do not provide sufficient fluid viscosity for the majority of oil well applications.

Figure 2:
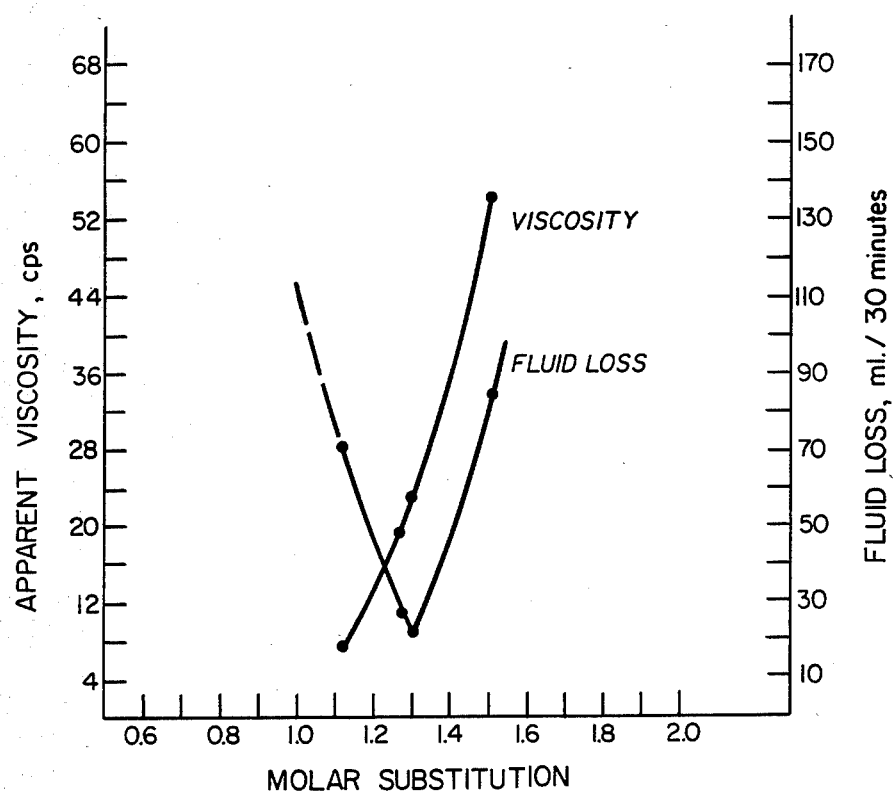
FIG. 2 is a graph of the viscosity and fluid loss values in 9.2 ppg NaCl saline solution for HEC over a range of MS values.

FIGS. 1 and 2 demonstrate how the apparent viscosity and fluid loss properties of HEC vary over a range of M.S. values under various salinity conditions. At 2 lb./barrel in fresh water, shown in FIG. 1, it is evident that minimal fluid loss occurs at an M.S. of about 1.2. Apparent viscosities of at least at about 15 cps are present at M.S. values of at least about 1.1. At 2 lb./barrel in 9.2 ppg brine, shown in FIG. 2, minimal fluid loss occurs at an M.S. value of about 1.3. Apparent viscosities of at least about 15 cps occur at M.S. values greater than or equal to about 1.25. Optimum M.S. level will depend upon the presence and degree of salinity of the drilling fluid. Viscosity will vary based on HEC molecular weight.

Unlike fluid viscosity which generally increases with increasing M.S. values of HEC, fluid loss initially decreases, passes through a minimum and thereafter increases as the M.S. of hydroxyethyl cellulose is increased from 0.75 to about 2.0. Accordingly, by proper selection of the HEC additive, a drilling fluid can be provided which will satisfy the dual requirements of fluid viscosity and minimized fluid loss for the majority of oil well applications. An M.S. value of HEC in the range of about 1.2 to about 1.5, and preferably from about 1.4 to about 1.5 will ordinarily provide such desired viscosity and minimized fluid loss.

PREPARATION OF HYDROXYETHYL CELLULOSE

A mixture of isopropyl alcohol, water and cellulosic material (e.g., cotton linters) is added to a sealed agitated reactor which is then purged with nitrogen. An aqueous NaOH solution is then stirred into the reactor to form alkali cellulose. The weight ratios of reagents charged to the reactor relative to the cellulosic material are as follows: isopropyl alcohol, 13:1; water, 3.1:1; and NaOH, 0.35:1. Ethylene oxide is then added to the reactor solution and the temperature increased to 75° C. and maintained constant for about 1 hour. The ethylene oxide charge is varied in direct ratio to the desired M.S. of the product. Thus, for example, at weight ratios of 1.13 and 0.76 of ethylene oxide to cellulosic material, the M.S. of the resulting product is 1.8 and 1.2 M.S., respectively. The reaction mixture is then cooled to ambient temperature and acidified with sufficient nitric or acetic acid to neutralize any excess alkali. The addition of a slight excess of acid is generally preferred. The product is then purified by extraction with an isopropanol/water mixture, dried at a temperature of from about 50° C. to 110° C. and then ground to the desired particle size. The M.S. value of the product is determined by analysis in accordance with ASTM method D 2364-75.

DESCRIPTION OF TEST PROCEDURE

In the following examples, the results of which are shown in Tables I and II below, hydroxyethyl cellulose materials of varying M.S. were prepared in accordance with the above-described procedure and evaluated in fresh water, a 9.2 ppg (pounds per gallon) brine containing NaCl and a saturated brine weighing about 10 ppg, such brines corresponding to the composition of known drilling fluids. The HEC materials were charged into the drilling fluid to be tested using a Lightning mixer equipped with two 3-bladed propellers to form the test solution. The API fluid loss was then measured in accordance with the above-identified procedure, and the viscosity of the solution was determined at 300 and 600 rpm with a Fann model 35 Viscometer as described in "Standard Procedure For Testing Drilling Fluids", American Petroleum Institute, Section 2, API RP 13B, Seventh Edition, April, 1978. The apparent viscosity in centipoises was calculated as the 600 rpm reading divided by two.

In Table I, the fluid loss and viscosity are disclosed for a range of HEC materials which were tested in fresh water at ambient temperature. When using HEC having an M.S. of 2.0, the fluid loss of the solution was greater then 350 ml/30 min., the highly undesirable condition referred to as a "blowout".

Table II discloses the use of hydroxyethyl cellulose additives of varying M.S. in fresh water and two different brine solutions at three different levels of HEC concentration. Examples 15, 21 and 27 demonstrate that for all three test fluids and at all three levels of HEC concentrations, an HEC additive having an M.S. of 2.0 (corresponding to that used conventionally as a viscosifier in drilling fluids) was unable to prevent fluid blowout and hence is ineffective for purposes of fluid loss control. In contrast thereto the HEC additives of the present invention were able to substantially minimize the fluid loss for all three test fluids.

TABLE I

EVALUATION OF HYDROXYETHYL CELLULOSE OF VARYING M.S. AS FLUID LOSS ADDITIVES IN FRESH WATER

| EXAMPLE | M.S. OF HEC[a] | APPARENT VISCOSITY (cps) | API FLUID LOSS (ml/30 min.) |
|---|---|---|---|
| 1 (Control) | 0.50 | 1.5 | 180 |
| 2 (Control) | 0.75 | 2 | 350 |
| 3 (Control) | 1.0 | 11.5 | 50 |
| 4 | 1.1 | 24 | 40 |
| 5 | 1.2 | 38.7 | 24.3 |
| 6 | 1.3 | 49 | 56.5 |
| 7 | 1.4 | 51.5 | 101 |
| 8 | 1.5 | 54 | 232 |
| 9 (Control) | 2.0 | 45 | Blowout[b] |

[a]HEC Concentration - 2 lb/barrel.
[b]All 350 ml of the test solution passed through the filter in less than 30 minutes.

TABLE II

EVALUATION OF LOW M.S. HYDROXYETHYL CELLULOSE AS A FLUID LOSS ADDITIVE IN FRESH WATER AND NaCl BRINES

| Example | M.S. | Apparent Viscosity (CPs) | | | API Fluid Loss (ml/30 min.) | | |
|---|---|---|---|---|---|---|---|
| | | Fresh Water | 9.2 ppg NaCl | Sat'd NaCl (10 ppg) | Fresh Water | 9.2 ppg NaCl | Sat'd NaCl (10 ppg) |
| HEC Concentration - 1 lb/barrel | | | | | | | |
| 10 | 1.15 | 11 | 5 | — | 55 | 100 | — |
| 11 | 1.27 | 16 | 12 | 15 | 136 | 53 | BO* |
| 12 | 1.43 | 14 | 16 | 13 | 260 | 135 | 50 |
| 13 | 1.51 | 15 | 16 | 18 | 160 | 100 | 57 |
| 14 | 1.62 | 16 | 19 | 16 | BO* | 280 | 60 |
| 15(Control) | 2.0 | 18 | 18 | 18 | BO* | BO* | BO* |
| HEC Concentration - 2 lb/barrel | | | | | | | |
| 16 | 1.15 | 38 | 10 | 12 | 26 | 50 | 112 |
| 17 | 1.27 | 50 | 39 | 19 | 41 | 45 | 35 |
| 18 | 1.43 | 49 | 52 | 36 | 135 | 75 | 25 |
| 19 | 1.51 | 52 | 52 | 50 | 98 | 73 | 32 |
| 20 | 1.62 | 51 | 54 | 47 | 310 | 180 | 25 |
| 21(Control) | 2.0 | 48 | 53 | 45 | BO* | BO* | BO* |
| HEC Concentration - 3 lb/barrel | | | | | | | |
| 22 | 1.15 | — | — | — | — | — | — |
| 23 | 1.27 | 114 | 95 | 31 | 5 | 20 | 20 |
| 24 | 1.43 | 105 | 110 | 67 | 50 | 25 | 15 |
| 25 | 1.51 | — | — | 116 | — | — | 28 |
| 26 | 1.62 | 109 | 115 | 102 | 165 | 55 | 12 |
| 27(Control) | 2.0 | 95 | 103 | 102 | BO* | BO* | BO* |

*BO = Blowout - all 350 ml of the test solution passed through the filter in less than 30 minutes.

What is claimed is:

1. In a method of conducting a drilling operation for the recovery of gas and/or oil from a porous subterranean formation wherein a water-base drilling fluid is circulated in a well penetrating the subterranean formation, such fluid circulation being characterized by an undesirable loss of said drilling fluid into the surrounding porous formation, the improvement for minimizing fluid loss into said formation, which comprises employing a drilling fluid containing an effective amount of hydroxyethyl cellulose having a molar substitution value of from about 1.1 to about 1.6, and wherein said drilling fluid is substantially free of bridging particles capable of preventing fluid loss from the well into the porous formation.

2. The method of claim 1 wherein the API fluid loss of said drilling fluid is less than 100 ml/30 min.

3. The method of claim 2 wherein the API fluid loss is less than 50 ml/30 min.

4. The method of claim 1 wherein the molar substitution of the hydroxyethyl cellulose is from about 1.2 to about 1.5.

5. The method of claim 1 wherein the concentration of hydroxyethyl cellulose in the drilling fluid is from about 0.75 to about 3 lbs./barrel.

6. The method of claim 1 wherein said drilling fluid consists essentially of water and said hydroxyethyl cellulose.

* * * * *